(12) United States Patent
Wang et al.

(10) Patent No.: US 12,287,991 B2
(45) Date of Patent: Apr. 29, 2025

(54) RAID OPTIMIZATION METHOD FOR MULTI-PASS PROGRAMING NAND, AND COMPUTER DEVICE

(71) Applicant: SHENZHEN UNIONMEMORY INFORMATION SYSTEM LIMITED, Guangdong (CN)

(72) Inventors: Meng Wang, Guangdong (CN); Weihua Xu, Guangdong (CN); Fangfang Guo, Guangdong (CN)

(73) Assignee: SHENZHEN UNIONMEMORY INFORMATION SYSTEM LIMITED, Guangdong (CN)

( * ) Notice: Subject to any disclaimer, the term of this patent is extended or adjusted under 35 U.S.C. 154(b) by 0 days.

(21) Appl. No.: 18/250,646

(22) PCT Filed: Sep. 7, 2022

(86) PCT No.: PCT/CN2022/117585
§ 371 (c)(1),
(2) Date: Apr. 26, 2023

(87) PCT Pub. No.: WO2023/098207
PCT Pub. Date: Jun. 8, 2023

(65) Prior Publication Data
US 2024/0385781 A1    Nov. 21, 2024

(30) Foreign Application Priority Data
Nov. 30, 2021 (CN) .......................... 202111444258.7

(51) Int. Cl.
G06F 3/00 (2006.01)
G06F 3/06 (2006.01)

(52) U.S. Cl.
CPC .......... *G06F 3/0689* (2013.01); *G06F 3/0604* (2013.01); *G06F 3/0655* (2013.01)

(58) Field of Classification Search
None
See application file for complete search history.

(56) References Cited

U.S. PATENT DOCUMENTS

2012/0134211 A1* 5/2012 Kashiwagi ............. G11C 16/26
                                                    365/185.11
2017/0371744 A1  12/2017 Sehgal et al.
(Continued)

FOREIGN PATENT DOCUMENTS

CN    108073357 A    5/2018
CN    111326199 A    6/2020

*Primary Examiner* — Midys Rojas
(74) *Attorney, Agent, or Firm* — Brooks Kushman P.C.

(57) ABSTRACT

The present application relates to a RAID optimization method and apparatus for Multi-Pass NAND programming, a computer device, and a storage medium. The method includes: obtaining a RAID optimization request for the Multi-Pass NAND programming; performing, by a RAID engine, encoding on cached user data of a corresponding RAID stripe during each Pass programming, according to the RAID optimization request of the Multi-Pass NAND programming; generating corresponding Parity data in real time through the encoding by the RAID engine; releasing a buffer area for storing the Parity after a corresponding Pass programming is completed, without waiting until all-Passes programming has been completed. According to the present application, aiming at a Multi-Pass programming scenario, RAID parity data is dynamically generated without buffering the corresponding parity data during each pass programming. The RAID parity data is generated in real time, so that a requirement on a memory of a SOC is reduced, a performance of a SSD is improved accordingly, and the cost is reduced.

4 Claims, 5 Drawing Sheets

(56) References Cited

U.S. PATENT DOCUMENTS

2020/0110661 A1    4/2020  Singidi et al.
2021/0191807 A1    6/2021  Yeung et al.

\* cited by examiner

RAID OPTIMIZATION METHOD FOR MULTI-PASS PROGRAMING NAND, AND COMPUTER DEVICE

CROSS-REFERENCE TO RELATED APPLICATIONS

The present application is a 35 U.S.C. § 371 national stage application of PCT patent application No. PCT/CN2022/117585, filed on Sep. 7, 2022, which claims priority to Chinese patent application No. 202111444258.7, filed on Nov. 30, 2021. The entire contents of which are incorporated herein by reference.

TECHNICAL FIELD

The present application relates to the technical field of storage system, and more particularly, to a RAID optimization method for Multi-Pass NAND programming, a RAID optimization apparatus for Multi-Pass NAND programming, a computer device and a non-transitory computer-readable storage medium.

BACKGROUND

With the development of solid-state disk (Solid State Disk, SSD) technology, SSDs have been widely used in plurality of occasions, and has gradually replaced traditional hard disk drives (Hard Disk Drives, HDDs) in the PC market, and provide users with better experience in reliability and performance. With the evolution of NAND technology, the programming model of NAND has become more and more complex, which is developed from earlier single pass programming to the recent Multi-Pass programming. For Multi-Pass programming memory cells, during each pass programming, all page data needs to be transmitted to NAND, and accordingly, the corresponding data needs to be cached in the SSD memory.

Currently, in the conventional design of SSD, RAID is generally used to improve the reliability of SSD. For N user data, 1 parity data is generated through a RAID engine and is written to NAND. Due to the requirement of Multi-Pass programming, RAID parity data must be transmitted to NAND for multiple times. Thus, it is necessary to buffer the corresponding parity data until all-Passes programming on a corresponding page is completed, so that the demand for the SSD memory is increased. Furthermore, due to the fact that the RAID engine uses a rapid memory (e.g., a SRAM) in a system on chip (System on Chip, SOC), which has a limited memory space, the parity data needs to be copied to a slow memory (e.g., a DRAM), this copying process has a significant impact on the performance of NAND of SSD.

SUMMARY

In view of this, it is necessary to provide a RAID optimization method for Multi-Pass NAND programming, and a computer device to solve the aforesaid technical problem.

A redundant arrays of independent disks (RAID) optimization method for Multi-Pass NAND programming is provided, the method is implemented by a computer device and includes:

obtaining a RAID optimization request for the Multi-Pass NAND programming;
performing, by a RAID engine, encoding on cached user data of a corresponding RAID stripe during each Pass programming, according to the RAID optimization request of the Multi-Pass NAND programming;
generating corresponding Parity data in real time through the encoding by the RAID engine; and
releasing a buffer area for storing the Parity data after a corresponding Pass programming is completed, without waiting until all-Passes programming is completed.

In one embodiment, the method further includes:
encoding the user data of the RAID stripe through the RAID engine to generate the corresponding Parity data;
transmitting the user data and the Parity data to pages of a plurality of DIEs of a solid state drive (SSD) for one-Pass programming; and
releasing the corresponding buffer area for storing the Parity data after the one-Pass programming is completed.

In one embodiment, the method further includes:
performing Multi-Pass programming for the pages of the plurality of DIEs in an interleaved manner in a Multi-Pass programming model; and
continuing to perform two-Pass programming for the RAID stripe again after the one-Pass programming for all related interleaved programming pages has been completed.

In one embodiment, the method further includes:
determining whether all-Passes programming for the pages of the plurality of DIEs has been completed;
continuing to perform Pass programming of user data corresponding to the pages of the plurality of DIEs if all-Passes programming for the pages of the plurality of DIEs has not been completed; completing the Multi-Pass programming for the pages of the plurality of DIEs, if all-Passes programming for the pages of the plurality of DIEs has been completed.

A computer device, which includes a memory and a processor the memory stores a computer program, that, when being executed by a processor, causes the processor to perform steps of the aforesaid RAID optimization method for Multi-Pass NAND programming.

A non-transitory computer-readable storage medium which stores a computer program that, when being executed by a processor, causes the processor to implement the aforesaid RAID optimization method for Multi-Pass NAND programming.

According to the RAID optimization method and apparatus for Multi-Pass NAND programming, the computer device and the storage medium, the RAID optimization request for the Multi-Pass NAND programming is required; the RAID engine performs encoding again by using user data cached in the corresponding RAID stripe during each Pass programming according to the RAID optimization request of the Multi-Pass NAND programming; the corresponding Parity data is generated in real time through the encoding by the RAID engine; the buffer area for storing the Parity data is released after the corresponding pass programming is completed, without waiting until all-Passes programming is completed. According to the present application, aiming at a Multi-Pass programming scenario, the RAID parity data is dynamically generated without buffering the corresponding parity data during each pass programming. The RAID parity data is generated in real time, so that the memory requirement on the memory of the SOC is reduced, the performance of the SSD is improved accordingly, and the cost is reduced.

DETAILED DESCRIPTION OF EMBODIMENTS

In order to make the objective, the technical solutions and the advantages of the present application be clearer and more understandable, the present application will be further described in detail below with reference to accompanying figures and embodiments. It should be understood that the embodiments described in detail herein are merely intended to illustrate but not to limit the present application.

Currently, a typical NAND include: DIEs, that is, the units that can be operated independently and concurrently; blocks, that is, independently erasable units, the entire block must be erased before a next write operation is performed after data is written into the physical locations of the block; pages, that is, read/write units, pages in the same physical block must be programmed sequentially according to 0→1→2→3 . . . . With the evolution of NAND technology, the page programming model of the NAND has become more and more complex. Quad level cell (Quad Level Cell, QLC) is taken as an example, it needs to program pages for multiple times according to a certain rule to achieve a stable state of the QLC. During this period, the data that needs to be stored needs to be transmitted to NAND for multiple times.

Figure 1:
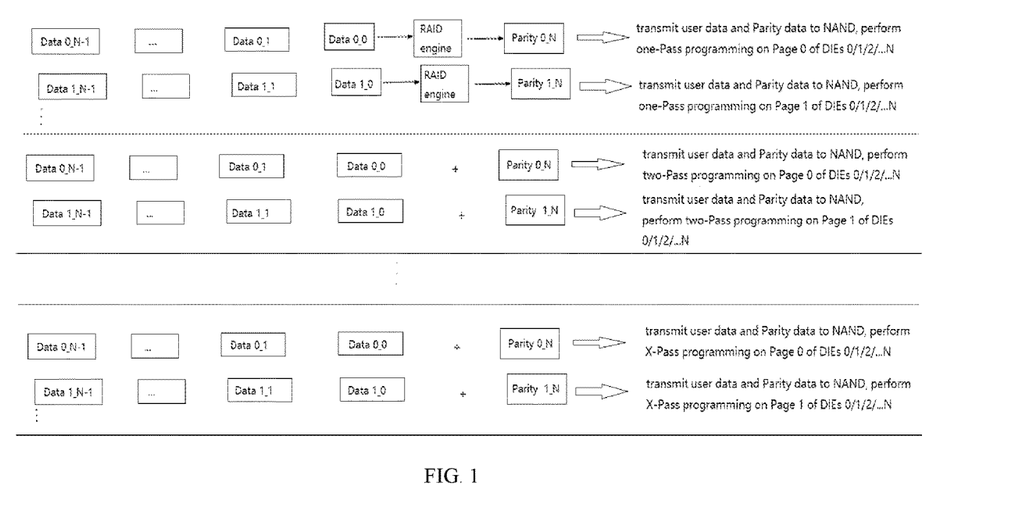
FIG. 1 illustrates a schematic diagram of one traditional Multi-Pass NAND RAID model.

As shown in FIG. 1, FIG. 1 illustrates a schematic diagram of a traditional Multi-Pass NAND RAID model. Where Data 0_0, Data 0_1, Data 0_2 . . . , Data 0 N-1 are N user data of the same redundant arrays of independent disks (Redundant Arrays of Independent Disks, RAID) stripe (which is referred to as stripe 0). The user data of the RAID stripe 0 is encoded by a RAID engine to generate corresponding Parity data (i.e., Parity 0_N). The N (user data)+1 (RAID Parity data) are transmitted to Page 0 of Block X of the plurality of DIEs of a solid state drive (Solid State Drive, SSD) for one-Pass programming. Moreover, since the RAID Parity data are also needed to be transmitted to NAND in subsequent passes, thus, it is necessary to continue to store cached data in the memory. In a Multi-Pass programming model, Multi-Pass programming for the pages are performed in an interleaved manner, the generation of Parities of the RAID strip 1 are performed sequentially, writing the Parities into Page 1 of the Block X of the plurality of DIEs are performed sequentially, either. After Pass 1 of all related interleaved pages is completed, two-Pass programming of the RAID stripe 0 is continued to be performed again. In this condition, the cached RAID Parity data is directly used as the corresponding parity data. Two-Pass programming for the RAID stripe 1 is performed sequentially. In this condition, the Parity data cached in the memory is still used. The process is cyclically performed until all related interleaved programming stripes have completed data writing of all Passes. During this process, since all data needs to be transmitted to NAND for every Pass programming, so that RAID stripe data needs to be kept in a buffer area for storing RAID Parity (which is generally a rapid SRAM within a SOC), the buffer area may be released only when all-Passes programming for all interleaved pages have been completed. This process has a high requirement on the buffer area for storing the RAID Parity, so that the cost of SOC is greatly increased.

Figure 2:
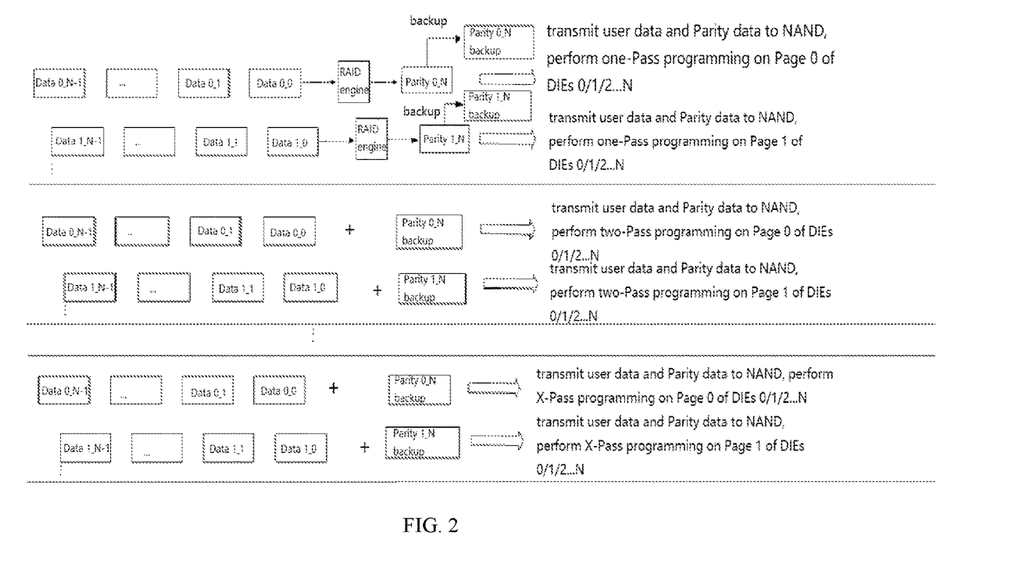
FIG. 2 illustrates a schematic diagram of another traditional Multi-Pass NAND RAID model.

As shown in FIG. 2, FIG. 2 illustrates a schematic diagram of another traditional Multi-Pass NAND RAID model. During this process which is similar to the model in FIG. 1, the RAID parity data also needs to be stored in the buffer area. However, considering that a system on chip (System on Chip, SOC) having a rapid SRAM has a high cost. Thus, the Parity data generated by the RAID engine may be copied to a slow memory (the slow memory has a large memory space, generally, the slow memory may be such as DRAM) in one-Pass programming. This process may reduce the cost of the SOC. However, frequent data copying in the memory has a significant impact on the overall performance of NAND.

On this basis, the present application proposes a RAID optimization method for Multi-Pass NAND programming, which aims to reduce the requirement on the buffer area of Memory of SOC in Multi-Pass programming scenario.

Figure 3:
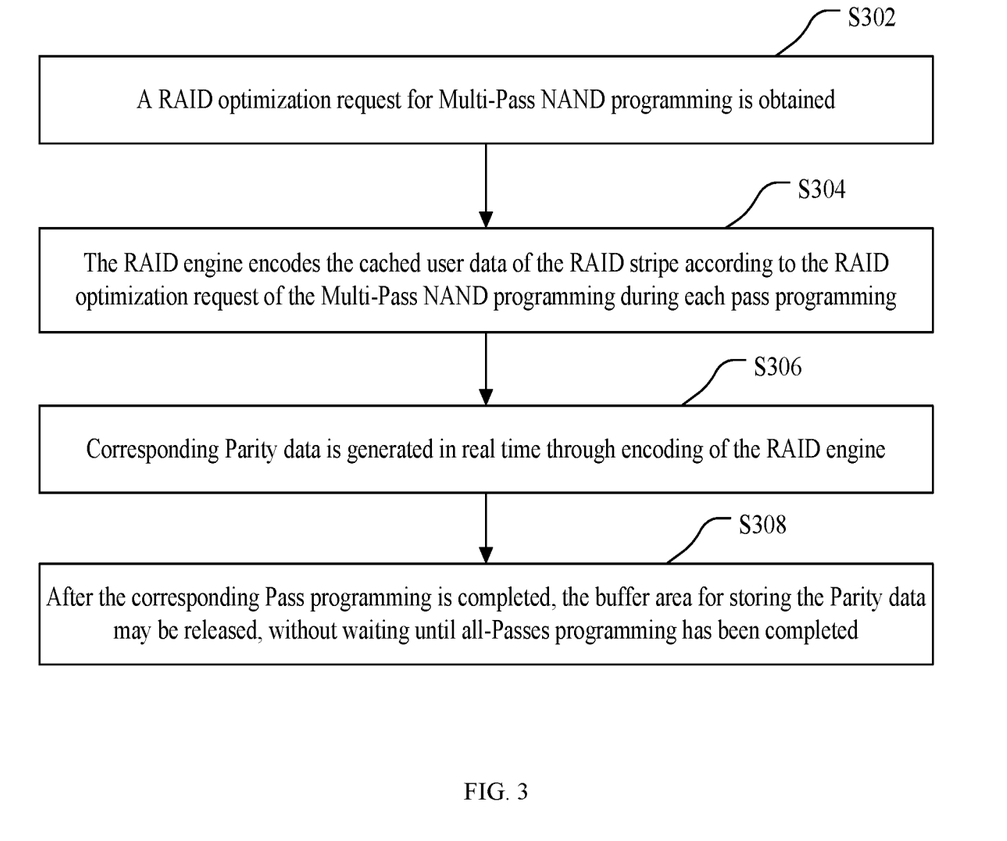
FIG. 3 illustrates a schematic flow diagram of one RAID optimization method for the Multi-Pass NAND programming in one embodiment.

In one embodiment, as shown in FIG. 3, a RAID optimization method for Multi-Pass NAND programming is provided, this method includes:

In a step of S302, a RAID optimization request for Multi-Pass NAND programming is obtained.

In a step of S304, the RAID engine encodes the cached user data of the RAID stripe according to the RAID optimization request of the Multi-Pass NAND programming during each pass programming.

In a step of S306, corresponding Parity data is generated in real time through encoding of the RAID engine.

In a step of S308, after the corresponding Pass programming is completed, the buffer area for storing the Parity data may be released, without waiting until all-Passes programming has been completed.

In this embodiment, a RAID optimization method for Multi-Pass NAND programming is provided. This method aims at the Multi-Pass programming scenario. During each Pass programming, since N user data needs to be transmitted to NAND for multiple times, buffer area is inevitably required. Accordingly, one RAID parity data corresponding to the N user data is regenerated each time, so that the requirement of the buffer area for data backup of the RAID Parity data is reduced.

In one embodiment, the method further includes: whether all-Passes programming for Page 0 has been completed is determined; if all-Passes programming for Page 0 is not completed, the corresponding Pass programming for user data corresponding to the Page 0 of the plurality of DIEs is continued to be performed; if all-Passes programming for Page 0 has been completed, the pass programming on the page 0 of the plurality of DIEs is completed.

Figure 4:
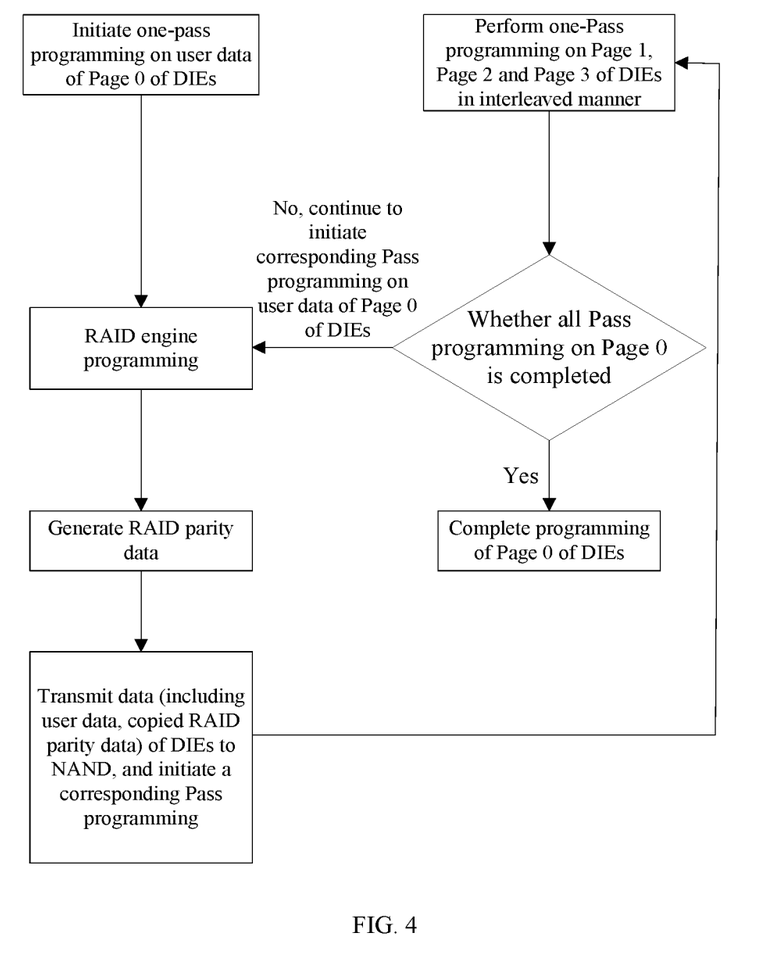
FIG. 4 illustrates a schematic flow diagram of a corresponding Multi-Pass writing process of the NAND in one embodiment.

Referring to FIG. 4, FIG. 4 illustrates a flow diagram of a corresponding Multi-Pass NAND writing process in this embodiment. The specific steps for implementation of the Multi-Pass NAND writing process are described below:

First, one-pass programming is performed on user data of Page 0 of the plurality of DIEs. Then, user data of the RAID stripe is encoded by the RAID engine to generate RAID parity data.

Then, the data of the plurality of DIEs (which includes user data and generated RAID parity data) is transmitted to NAND, and a corresponding Pass programming is initiated. The one-Pass programming is performed on Page 1/2/3 of the plurality of DIEs in an interleaved manner.

Finally, check whether all-Passes programming on the Page 0 has been completed. If all-Passes programming on the Page 0 has been completed, the programming of Page 0 of the plurality of DIEs is completed. If all-Passes programming on the Page 0 has not been completed, the corresponding Pass programming for user data of Page 0 of the plurality of DIEs is continued to be performed.

During this process, during each Pass programming, the RAID engine encodes the cached user data of the RAID stripe to generate real-time Parity data. After the corresponding Pass programming is completed, the buffer area for storing the Parity data may be released without waiting until all-Passes programming has been completed.

In the embodiment described above, the RAID optimization request for Multi-Pass NAND programming is obtained. According to the RAID optimization request of the Multi-Pass NAND programming, during each pass programming, the RAID engine performs encoding on the cached user data of the corresponding RAID stripe; the corresponding Parity data is generated in real time through the encoding of the RAID engine. After the corresponding Pass programming is completed, the buffer area for storing the Parity data may be released without waiting until all-Passes programming has been completed. The aforesaid technical solution aims at Multi-Pass programming scenario. During each Pass programming, the RAID parity data is dynamically generated without caching the corresponding Parity data. The RAID parity data is generated in real time, so that the requirement on the buffer area of Memory of SOC is reduced, the performance of SSD is improved, and the cost is reduced.

Figure 5:
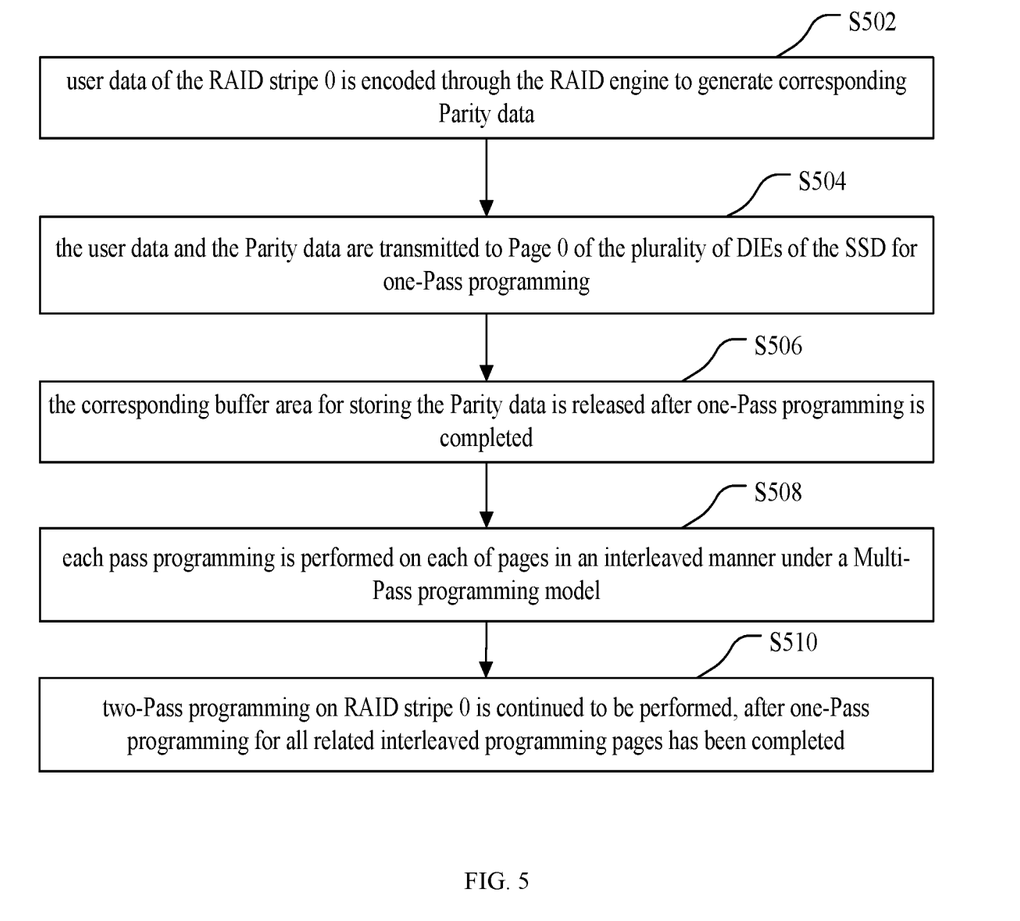
FIG. 5 illustrates a schematic flow diagram of another RAID optimization method for the Multi-Pass NAND programming in one embodiment.

In one embodiment, as shown in FIG. 5, a RAID optimization method for Multi-Pass NAND programming is provided. This method further includes:

In a step of S502, user data of the RAID stripe 0 is encoded through the RAID engine to generate corresponding Parity data.

In a step of S504, the user data and the Parity data are transmitted to Page 0 of the plurality of DIEs of the SSD for one-Pass programming.

In a step of S506, the corresponding buffer area for storing the Parity data is released after one-Pass programming is completed.

In a step of S508, each pass programming is performed on each of pages in an interleaved manner under a Multi-Pass programming model;

In a step of S510, two-Pass programming on RAID stripe 0 is continued to be performed, after one-Pass programming for all related interleaved programming pages has been completed.

Figure 6:
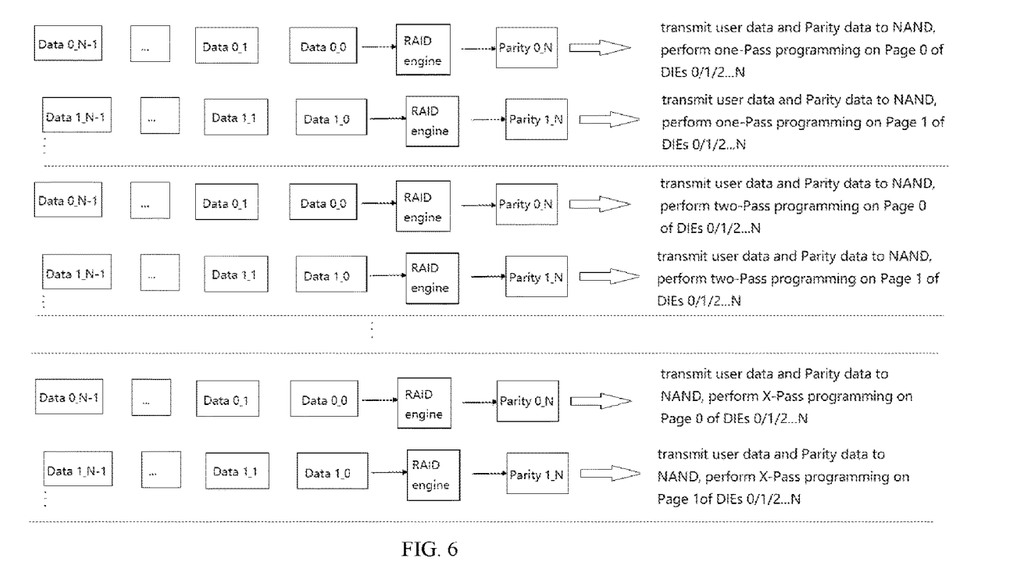
FIG. 6 illustrates a schematic diagram of a RAID model during programming of the Multi-Pass NAND in one embodiment.

Referring to FIG. 6, the specific steps for implementation of the RAID model for Multi-Pass NAND programming introduced in this embodiment are described below:

In step 6.1, Data 0_0, Data 0_1, Data 0_2 . . . , Data 0_N−1 refers to N user data of the same RAID stripe (which is referred to as stripe 0).

In step 6.2, the user data of the RAID stripe 0 is encoded by the RAID engine to generate the corresponding Parity data (Parity 0_N).

In step 6.3, said N (user data) and 1 (RAID Parity data) are transmitted to Page 0 of Block X of the plurality of DIEs of the SSD for one-Pass programming. A buffer area for storing Parity 0_N may be released after the one-pass programming is completed.

In step 6.4, in the Multi-Pass programming model, multi-pass programming is performed on the pages in an interleaved manner, the generation of Parity of RAID strip 1, and the written of the parity into page 1 of Block X of the plurality of DIEs are performed sequentially.

In step 6.5, after one-Pass programming on all related interleaved pages has been completed, two-Pass programming for the RAID stripe 0 is continued to be performed again.

In this embodiment, similar to the one-Pass programming, the N user data is encoded by the RAID engine again, and the Parity 0_N is regenerated. The N user data and the Parity 0_N are transmitted to the Page 0 of the Block X of the plurality of DIEs of the SSD for two-Pass programming. The buffer area for storing the Parity 0_N is released after the two-Pass programming is completed.

In step 6.6, the two-Pass programming for RAID stripe 1 is performed sequentially. In this condition, the RAID engine regenerates the corresponding Parity data and writes the Parity data into NAND.

In step 6.7, the steps are cyclically performed until all related interleaved programmed RAID stripes have completed data writing of all-Passes.

In this embodiment, since user data is always cached in the memory, the corresponding RAID parity data is regenerated in real time during each Pass programming, so that the requirement on the volume of the buffer area of the SOC for storing Parity data is greatly reduced, and the cost is reduced. Moreover, there is no need to trigger a data copying and backup in the memory, so that the performance of NAND of SSD is not affected.

It should be understood that, although the steps in the flow diagram of FIGS. 1-6 are displayed sequentially according to the indication of the arrows, these steps are not necessarily performed in the order indicated by the arrows. The execution of these steps is not strictly limited unless being explicitly stipulated herein, and these steps can be performed in other order. Moreover, at least a part of the steps in FIGS. 1-6 may include a plurality of steps or phases, and these steps or phases are not necessarily performed at the same time, instead, these steps or phases can be performed at different moments, the order of execution of these steps or phases is not necessarily performed in sequence, instead, the order of execution of these steps or phases may be performed in turn or alternately with other steps or at least a part of steps or phases in other steps.

Figure 7:
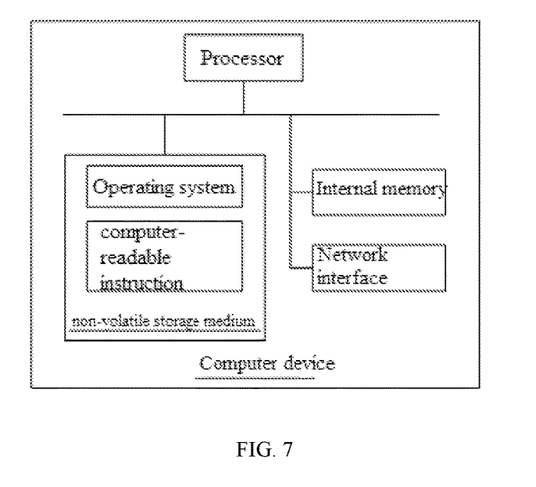
FIG. 7 illustrates an internal structural diagram of a computer device in one embodiment.

In one embodiment, a computer device is provided. The internal structure diagram of the computer device may be shown in FIG. 7. The computer device includes a processor, a memory, and a network interface which are connected through a bus. The processor of the computer device is used to provide computing and control capabilities. The memory of the computer device includes a non-volatile storage medium and an internal memory. The non-volatile storage medium stores an operating device, a computer program, and a database. The internal memory provides an environment for the operation of the operating device and the computer program in non-volatile storage medium. The network interface of the computer device is used to communicate with external terminal devices through a network connection. When the computer program is executed by the processor, the RAID optimization method for Multi-Pass NAND programming is implemented.

A person of ordinary skill in the art may understand that, FIG. 10 only illustrates a structural block diagram of the part associated with the technical solutions of the present application, and is not constituted as limitation to the computer device which the technical solutions of the present application are applied on. The detailed computer device may include components more or less than the components shown in FIG. 10, or combine some components, or have different component arrangement.

In one embodiment, a computer device is provided, the computer device includes a memory, a processor and a computer program stored in the memory and executable on the processor. When executing the computer program, the processor is configured to implement the steps in the various method embodiments.

In one embodiment, a computer-readable storage medium is provided. The computer-readable storage medium stores a computer program, that, when executed by the processor, implements the steps in the various method embodiments.

The person of ordinary skilled in the art may be aware of that, a whole or a part of flow process of implementing the method in the aforesaid embodiments of the present application may be accomplished by using computer program to instruct relevant hardware. The computer program may be stored in a non-volatile computer readable storage medium, when the computer program is executed, the steps in the various method embodiments described above may be included. Any references to memory, storage, databases, or other media used in the embodiments provided herein may include non-volatile and/or volatile memory. The non-volatile memory may include read only memory (Read Only Memory, ROM), programmable ROM, electrically programmable read only memory (Electrically Programmable Read Only Memory, EPROM), electrically erasable programmable read only memory (Electrically Erasable Programmable Read Only Memory, EEPROM), or flash memory. The volatile memory may include RAM (Random Access Memory) or external cache memory. By way of illustration instead of limitation, RAM is available in a variety of forms such as static RAM (Static RAM, SRAM), dynamic RAM (Dynamic RAM, DRAM), synchronous DRAM (Synchronous DRAM, SDRAM), double data rate (Double Data Rate, DDR) SDRAM, enhanced SDRAM (Enhanced SDRAM, ESDRAM), Synch link DRAM, Rambus Direct RAM (Rambus Direct RAM, RDRAM), Direct Ram Bus Dynamic RAM (Direct Ram Bus Dynamic RAM, DRDRAM), and Rambus Dynamic RAM (Rambus Dynamic RAM, RDRAM), etc.

The various technical features in the embodiments described above may be combined arbitrarily, for the convenience of describing, all possible combinations of the various technical features in the embodiments described above are not described, however, the combinations of these technical features should all be considered as being included in the protection scope of the description as long as they are not contradicted with each other.

Several implementation methods of the present application are described in the embodiments described above, and these implementation modes are described definitely and in detail, but should not be interpreted as limitations to the patent protection scope of the present application. It should be noted that, a person of ordinary skill in the art may also make some modifications and improvements without breaking away from the inventive concept of the present application, and these modifications and improvements are all included in the protection scope of the present application. Thus, the protection scope of the present application should be determined by the attached claims.

What is claimed is:

1. A redundant arrays of independent disks (RAID) optimization method for Multi-Pass NAND programming implemented by a computer device, comprising:
   obtaining a RAID optimization request for the Multi-Pass NAND programming;
   performing, by a RAID engine, encoding on cached user data of a first RAID stripe during each Pass programming, according to the RAID optimization request of the Multi-Pass NAND programming;
   generating corresponding Parity data in real time through the encoding by the RAID engine;
   transmitting the user data and the Parity data to pages of a plurality of DIEs of a solid state drive (SSD) for one-Pass programming; and
   releasing corresponding buffer area for storing the Parity data after the one-Pass programming is completed;
   the method further comprising following steps of:
   encoding the user data of the first RAID stripe through the RAID engine to generate the corresponding Parity data;
   performing the Multi-Pass programming for the pages of the plurality of DIEs in an interleaved manner in a Multi-Pass programming model;
   continuing to perform two-Pass programming for the first RAID stripe again after the one-Pass programming for all related interleaved programming pages has been completed, wherein the user data is encoded again by the RAID engine and the parity data is regenerated, the user data and the parity data are transmitted to the pages of the plurality of DIEs of the SSD for the two-Pass programing, the buffer area for storing the Parity data is released after the two-Pass programming is completed;
   performing the two-Pass programming for a second RAID strip, wherein the RAID engine regenerates the corresponding Parity data and writes the Parity data into the NAND; and cyclically performing the steps until all related interleaved programmed RAID stripes have completed data writing of all-Passes.

2. The RAID optimization method for the Multi-Pass NAND programming according to claim 1, further comprising:
   determining whether all-Passes programming for the pages of the plurality of DIEs has been completed;
   continuing to perform Pass programming of user data corresponding to the pages of the plurality of DIEs if all-Passes programming for the pages of the plurality of DIEs has not been completed; completing the Multi-Pass programming for the pages of the plurality of DIEs, if all-Passes programming for the pages of the plurality of DIEs has been completed.

3. A computer device, comprising a memory and a processor and a computer program stored in the memory and executable by the processor, wherein the processor is configured to implement, when executing the computer program, steps of the RAID optimization method for Multi-Pass NAND programming according to claim 1.

4. A non-transitory computer-readable storage medium which stores a computer program, that, when being executed by a processor, causes the processor to implement the RAID optimization method for Multi-Pass NAND programming according to claim 1.

* * * * *